(12) United States Patent
Lyon et al.

(10) Patent No.: US 10,856,367 B2
(45) Date of Patent: Dec. 1, 2020

(54) ELECTRICAL CONNECTOR

(71) Applicant: PILKINGTON GROUP LIMITED, Lancashire (GB)

(72) Inventors: Michael Lyon, Ormskirk (GB); Jonathan Mark Williams, Southport (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 372 days.

(21) Appl. No.: 15/754,875

(22) PCT Filed: Aug. 4, 2016

(86) PCT No.: PCT/GB2016/052397
§ 371 (c)(1),
(2) Date: Feb. 23, 2018

(87) PCT Pub. No.: WO2017/032972
PCT Pub. Date: Mar. 2, 2017

(65) Prior Publication Data
US 2018/0263083 A1    Sep. 13, 2018

(30) Foreign Application Priority Data
Aug. 24, 2015 (GB) .................................. 1515010.5

(51) Int. Cl.
*H05B 3/84* (2006.01)
*B23K 1/00* (2006.01)
(Continued)

(52) U.S. Cl.
CPC ............. *H05B 3/84* (2013.01); *B23K 1/0016* (2013.01); *B23K 1/19* (2013.01); *B23K 35/24* (2013.01);
(Continued)

(58) Field of Classification Search
CPC ........ H01R 4/029; H01R 4/187; H01R 4/625; H01R 4/02; H05B 3/84; H05B 2203/016; B23K 1/0016; B23K 1/19; B23K 35/24
See application file for complete search history.

(56) References Cited

U.S. PATENT DOCUMENTS 3,519,890 A * 7/1970 Ashby ..................... H01L 24/80
361/776
4,568,918 A * 2/1986 Edel ....................... H01H 13/702
200/5 A
(Continued)

FOREIGN PATENT DOCUMENTS

DE  20 2013 007 819 U1  12/2013
DE  20 2015 002 764 U1   5/2015
(Continued)

OTHER PUBLICATIONS

International Search Report (PCT/ISA/210) dated Oct. 20, 2016, by the European Patent Office as the International Searching Authority for International Application No. PCT/GB2016/052397.
(Continued)

*Primary Examiner* — Patrick M. Buechner
(74) *Attorney, Agent, or Firm* — Buchanan Ingersoll & Rooney PC (57) ABSTRACT

An electrical connector for a glazing including a first connector foot and a second connector foot for soldering to the glazing, and a bridge portion comprising sheet metal having a thickness in a specified range linking the first connector foot and second connector foot. The first connector foot and the second connector foot each are shaped so that most of the perimeter of each foot is curved, the first connector foot and the second connector foot are connected to the bridge portion by a first neck portion and a second neck portion respectively, and the first neck portion and the second neck
(Continued)

portion each have a narrower width than a width of the bridge portion.

20 Claims, 4 Drawing Sheets

(51) Int. Cl.
*B23K 1/19* (2006.01)
*B23K 35/24* (2006.01)
*H01R 4/02* (2006.01)

(52) U.S. Cl.
CPC ......... *H01R 4/02* (2013.01); *H05B 2203/016* (2013.01)

(56) References Cited

U.S. PATENT DOCUMENTS

| | | | | |
|---|---|---|---|---|
| 4,797,110 | A * | 1/1989 | Ponziani | H01R 4/028 228/180.1 |
| 5,015,206 | A * | 5/1991 | Dennis | H01R 12/57 29/874 |
| 6,024,596 | A * | 2/2000 | Tanaka | H01R 4/029 439/492 |
| 6,075,286 | A * | 6/2000 | Ewer | H01L 23/49562 257/666 |
| 2009/0170380 | A1 | 7/2009 | Lyon | |
| 2009/0233119 | A1 | 9/2009 | Lyon | |
| 2012/0298416 | A1 * | 11/2012 | Ziegler | B32B 15/018 174/75 R |
| 2013/0043066 | A1 * | 2/2013 | Cholewa | B23K 35/36 174/257 |
| 2014/0110166 | A1 | 4/2014 | Degen et al. | |
| 2014/0158424 | A1 | 6/2014 | Schlarb et al. | |
| 2014/0182932 | A1 | 7/2014 | Cholewa et al. | |
| 2015/0236438 | A1 * | 8/2015 | Rateiczak | B23K 1/20 439/884 |
| 2015/0296569 | A1 | 10/2015 | Rateiczak et al. | |
| 2015/0296615 | A1 * | 10/2015 | Schmalbuch | H05K 1/0306 174/257 |
| 2017/0033481 | A1 * | 2/2017 | Schmalbuch | H05B 3/84 |
| 2017/0297130 | A1 | 10/2017 | Jenrich | |
| 2017/0368642 | A1 * | 12/2017 | Pereira | C22C 13/00 |
| 2018/0138575 | A1 * | 5/2018 | Sarkis | H01Q 1/1271 |
| 2020/0136283 | A1 * | 4/2020 | Webb | H05B 3/84 |

FOREIGN PATENT DOCUMENTS

| | | |
|---|---|---|
| GB | 2 357 638 A | 6/2001 |
| JP | S 57-197761 A | 12/1982 |
| WO | WO 2007/110610 A1 | 10/2007 |
| WO | WO 2007/110612 A1 | 10/2007 |
| WO | WO 2007/110616 A1 | 10/2007 |
| WO | WO 2012/152542 A1 | 11/2012 |
| WO | WO 2012/152543 A1 | 11/2012 |
| WO | WO 2014/079595 A1 | 5/2014 |

OTHER PUBLICATIONS

Written Opinion (PCT/ISA/237) dated Oct. 20, 2016, by the European Patent Office as the International Searching Authority for International Application No. PCT/GB2016/052397.

Duong et al., Wettability of Lead-Free Solders on Gold-Plated Copper Substrates, *Materials Transactions*, May 25, 2008, pp. 1462-1466, vol. 49, No. 6, The Japan Institute of Metals. https://www.jim.or.jp/journal/e/49/06/1462.html.

* cited by examiner

ELECTRICAL CONNECTOR

TECHNICAL FIELD

The present invention relates to electrical connectors, to glazings and to methods of soldering electrical connectors to glazings.

BACKGROUND

It is often necessary to attach electrical connectors on to the surface of glazings to provide electrical power to devices associated with the glazing or to electrically connect devices on the glazing. Such electrical devices may include heaters which need electrical power or antennae which need connection to other devices. Electrical connections to glazings are often used in automotive glazings such as windscreens, rear windows or side windows.

DE 202015002764 U1 discloses an element for contacting a conductive surface with a soldering foot shaped in an approximate figure of eight.

DE 202013007819 U1 discloses an electric connector for connecting to a conductive element in a glazing part i.e. automobile glazing which has elements extending between feet without increasing the distance between the feet.

SUMMARY

JP-A-557197761 discloses adhering a terminal using solder by baking silver paste on a conductive element and applying a metal terminal comprising tin and lead.

It is known to solder electrical connectors on to the surface of an electrically conductive coating on the surface of a glazing (most often glass). Lead-containing solders have traditionally been used because they have high ductility that can adjust for the mechanical stresses existing between an electrical connector and a glass substrate to which the electrical connector is soldered.

However, there have been concerns about the use of lead containing solders in many countries and, in Europe, under European Union Directive 2000/53/EC, lead-containing solders are to be replaced by lead-free solders.

The use of lead-free solders to attach connectors to glass surfaces can, unfortunately, be problematic because lead-free solder can introduce high mechanical stress in the glass leading to glass cracks and breakage either during the soldering process or subsequently during temperature fluctuations in service.

There have been attempt to modify connectors and soldering processes to avoid or reduce such problems.

WO-A-2014/079595 discloses an electrical connector and a compensator plate, the compensator plate being connected to a pane with a conductive structure on the surface with lead-free solder.

US-A-2014/110166 discloses glazing panes having at least one electrical connection element. The panes have a substrate, an electrically conductive structure on a region of the substrate, a layer of a solder material on a region of the electrically conductive structure, and at least two soldering points of a connection element on the solder material. The soldering points have contact surfaces between the connection element and the electrically conductive structure, and the shape of contact surface has a segment of an oval, an ellipse, or a circle with a central angle of at least 90°.

US-A-2014/158424 discloses a method of producing a pane having an electrical connection element that is said to avoid problems with components having different thermal expansion coefficients.

WO-A-2007/110610 discloses glazings comprising a ply of glazing material having a first electrically conductive component mounted thereon, and a second electrically conductive component, joined to the first by a lead-free solder. The second component has a thickness t and comprises first and second connector feet linked by a bridge portion, the bridge portion being at a height h above each of the connector feet. t and/or h are chosen to minimise the occurrence of stress faults in the glass in the region of the solder.

WO-A-2007/110612 discloses glazings comprising a ply of glazing material having a first electrically conductive component mounted thereon, and a second electrically conductive component, joined to the first by a solder. The second component comprises first and second connector feet linked by a bridge portion, the bridge portion being at a height h above each of the connector feet, and each of the feet comprises at least one protrusion having a height (d). At least one of h or d is chosen to maximise the adhesion between the second electrically conductive component and the first electrically conductive component.

WO-A-2007/110616 discloses an improved electrical connector for use with a glazing. The glazing comprises a ply of glazing material having a first electrically conductive component mounted thereon, and a second electrically conductive component, joined to the first by a solder. The second component has a thickness t and comprises first and second connector feet linked by a bridge portion, the bridge portion being at a height h above each of the connector feet, and each of the feet comprises at least one protrusion having a height d. At least one oft, h or d is chosen to minimise the occurrence of stress faults in the glass in the region of the solder.

There is nevertheless still a need to provide an electrical connector which mitigates the stress associated with the use of solder, especially lead-free solder. It is an aim of the present invention to address such a need.

The present invention according provides, in a first aspect, an electrical connector for a glazing, the electrical connector comprising a first connector foot for soldering to the glazing and a second connector foot for soldering to the glazing, and a bridge portion comprising sheet metal having a thickness in the range 0.1 mm to 0.8 mm linking the first connector foot and second connector foot, wherein the first connector foot and the second connector foot each are shaped so that 60% or more of the perimeter of each foot is curved, and wherein the first connector foot and the second connector foot are connected to the bridge portion by a first neck portion and a second neck portion respectively and the first neck portion and the second neck portion each have a narrower width than the bridge portion.

This is greatly advantageous because the thickness of the sheet metal in combination with the curvature of the feet when soldered on a glazing has been shown to result in significantly less stress occurring in the glazing (even when lead-free solder is used) reducing the likelihood of breakage of glass substrates either during the soldering process or during use.

The first connector foot and the second connector foot are connected to the bridge portion by a first neck portion and a second neck portion respectively, and the first neck portion and the second neck portion each have a narrower width than the bridge portion. A narrower neck portion is advantageous because it reduces still further stress on the glazing when the connector feet are soldered to the glazing. Even less stress may be induced in the glazing when the sides of the first and second neck portion are curved, especially wherein the curved sides of the first and second neck portion are concave.

A perimeter of the connector feet having a curved portion is advantageous because temperature differences may arise at corners or straight edges of connectors leading to stress in the glazing and even cold spots where the solder does not flow or wet as easily or even does not melt. These issues may lead to poor adhesion of the connector feet and/or to mechanical stresses being induced in the glazing. Thus, it is advantageous if the first connector foot and the second connector foot each are shaped so that 70% or more, preferably 80% or more, more preferably 90% or more, of the perimeter of each foot is curved. Curved perimeters aid in efficient and even distribution of flowing solder, more even distribution of heat, and once the connector feet are soldered on the glazing, lead to more even electrical contact.

The first connector foot and the second connector foot may each be shaped so that the perimeter of each foot forms a closed curve.

It is preferred that the curved portion of the perimeter of the first connector foot and the perimeter of the second connector foot each form a convex curve.

In use, when the first and second connector feet are positioned on a glazing, the bridge portion may at a height h above the first and/or second connector feet, wherein h is preferably in the range 1 mm to 6 mm, more preferably 1 mm to 5 mm, most preferably 1 mm to 4 mm. A height below about 1 mm may result in relatively poor performance.

A suitable height, h, may be achieved by the electrical connector further comprising a double fold comprising an A fold and a B fold between each connector foot and the bridge, so that in side view, the electrical connector may have a step-like profile or "Z" shaped profile.

The angle of the A fold and B fold are generally independently selected.

The angle of the A fold (e.g. subtending an angle between the connector foot and the A fold to B fold portion of the electrical connector) may be right-angled or acute, that is preferably having an angle in the range 10° to 90°.

The A fold may, alternatively, have an angle that is obtuse, preferably in the range 90° or 91° to 170°, more preferably 110° to 165°, more preferably 115° to 160°, even more preferably 115° to 155°, and most preferably 115° to 140°.

Whether the angle of the A fold is acute, right-angled or obtuse, it is preferred that the angle of the A fold is such that the bridge portion is, as discussed above, at a height h above the first and/or second connector feet, wherein h is preferably in the range 1 mm to 6 mm.

The angle of the B fold (that may subtend an angle between the A fold to B fold portion of the electrical connector and the bridge portion) may be right-angled or acute preferably in the range 10° to 90°, or may be obtuse preferably in the range 90° or 91° to 170°.

The A fold and a B fold may each have a radius of curvature in the range 0.1 mm to 5 mm, preferably 0.5 mm to 5 mm.

If the folds of the double fold have a generally larger radius of curvature, the double fold may form a generally S-shaped profile.

The A fold may be situated directly above the connector foot which advantageously further reduces stress. In this case, the projection of the portion of the connector between the A and B fold would intersect with the connector foot.

It is convenient if the first connector foot and the second connector foot also comprise the sheet metal. The electrical connector may, therefore, be produced by stamping/cutting the shape of the connector out of sheet metal of appropriate thickness and composition and then, optionally, bending the correct parts of the electrical connector to form the shape of the electrical connector.

The sheet metal preferably has a thermal conductivity in the range 35 to 65 W/m° C., preferably 37 to 60 W/m° C., more preferably 39 to 55 W/m° C. which has great benefits in ensuring that the soldering process is efficient and the heating of the connector is even thereby reducing the chance of hot and/or cold spots.

It is preferred if the sheet metal of the connector has a coefficient of thermal expansion which is close to (i.e. matched) to the coefficient of thermal expansion of the substrate (usually the glass substrate) because thereby mechanical stresses during heating and cooling are reduced. Glass usually has a coefficient of thermal expansion in the range $6 \times 10^{-6}$/° C. to $10 \times 10^{0.6}$/° C. in a temperature range from 0° C. to 300° C.

Thus, preferably, the sheet metal has a thermal expansion coefficient in the range $1 \times 10^{-6}$/° C. to $20 \times 10^{-6}$/° C., preferably $2 \times 10^{-6}$/° C. to $20 \times 10^{-6}$/° C., more preferably 5 (or 6)$\times 10^{-6}$/° C. to $20 \times 10^{-6}$/° C., even more preferably $7 \times 10^{-6}$/° C. to $18 \times 10^{-6}$/° C., most preferably $8 \times 10^{-6}$/° C. to $13 \times 10^{-6}$/° C.

Preferably, the sheet metal has an electrical conductivity in the range $1 \times 10^6$ S/m to $9 \times 10^6$ S/m, preferably $2 \times 10^6$ S/m to $7 \times 10^6$ S/m, more preferably $3 \times 10^6$ S/m to $7 \times 10^6$ S/m, most preferably $3.4 \times 10^6$ S/m to $6.7 \times 10^6$ S/m. This provides suitable electrical conductivity to ensure correct electrical contact between the power supply of the vehicle (if used in an automotive glazing) and the electrical components on the glazing.

The sheet metal may comprise steel, copper, aluminium, or titanium, preferably steel, more preferably mild steel or an alloy of, for example, iron optionally comprising Mn and/or Ni.

An example of an advantageous alloy is an iron/Ni alloy, preferably having a Ni content of 25 wt % to 55 wt %, more preferably 27 wt % to 51 wt %, optionally containing Co and/or Mn. Examples of advantageous Fe/Ni alloys include Invar (FeNi36), Kovar (Fe with 29 wt % Ni and 17 wt % Co) and FeNi49 (Fe with 49 wt % Ni).

It is useful if the connector feet are provided with solder in the appropriate amount/weight. Thus, preferably, the electrical connector further comprises a solder deposit adhered to each foot of the connector, preferably a substantially lead-free solder deposit. Generally, the solder deposit may be a substantially annular solder deposit.

The solder is preferably a lead-free solder i.e. contains no lead. By no lead is meant having a lead content of 0.1 wt % or lower, preferably 0.05 wt % or lower. This is particularly advantageous because of environment benefits.

Lead-free solders often have lower ductility than lead-containing solders which can lead to high mechanical stresses between a connector and a glass substrate. One of the great advantages of connectors according to the present invention is that mechanical stress is reduced.

The solder may contain one or more of indium, tin, copper, silver, bismuth and zinc. The proportion of tin in the solder may be from 2 wt. % to 99 wt. %, preferably from 10 wt. % to 95 wt. %, more preferably from 15 wt. % to 60 wt. %. The proportion of bismuth, indium, zinc, copper, silver, in the solder composition may be from 0.5 wt. % to 98 wt. %, preferably 11 wt. % to 68 wt. %. The solder composition may contain nickel, germanium, aluminium, or phosphorus at 0.1 wt. % to 5 wt. %. A preferred solder composition is (in wt %) 96.5 Sn, 3 Ag, 0.5 Cu.

Preferably, at least a portion of each connector foot comprises a coating comprising copper, zinc, tin, silver, gold, or alloys or layers thereof, to improve wettability of the solder and protect the solder-contacting surface.

Preferably, each connector foot comprises a solder-contacting surface having at least one spacer to space the foot from the surface of the glazing. This is advantageous because it promotes even solder flow and wetting. The spacer may be an elevation spacer or one or more spacer stubs. The spacer may space the connector foot 0.1 mm to 3 mm from the glazing surface, preferably 0.1 mm to 2 mm, more preferably 0.15 mm to 1.5 mm and most preferably about 0.25 mm.

The substrate preferably comprises glass, more preferably float glass. The preferred glass material is soda lime glass.

Connectors according to the invention are suitable for soldering to a glazing surface even with lead-free solder.

Thus, the present invention provides, in a second aspect, a glazing comprising, a pane of glazing material, an electrically conductive layer on a surface of the pane, a solder deposit on the electrically conductive layer, and an electrical connector as discussed in relation to the first aspect on the solder deposit, wherein the electrical connector comprises a first connector foot and a second connector foot soldered to the glazing, and a bridge portion comprising sheet metal having a thickness in the range 0.1 mm to 0.8 mm linking the first connector foot and second connector foot, wherein the first connector foot and the second connector foot each are shaped so that 60% or more of the perimeter of each foot is curved. Preferably, the solder comprises lead-free solder.

The electrically conductive coating on the glazing may have a layer thickness of 5 μm to 40 μm, preferably 5 μm to 20 μm, more preferably, 8 μm to 15 μm and, most preferably 10 μm to 12 μm. The electrically conductive coating will usually comprise silver, preferably, silver particles and a glass frit.

The layer thickness of the solder will usually be 1 mm or lower, preferably 0.7 mm or lower, more preferably 0.5 mm or lower and most preferably 0.3 mm or lower.

Preferably, the solder, electrically conductive layer and the first connector foot and/or the second connector foot are adapted so that the solder wets the electrically conductive layer and/or the solder-contacting surface(s) of the first connector foot and/or the second connector foot. More preferably the solder wets the electrically conductive layer and/or the solder-contacting surface(s) of the first connector foot and/or the second connector foot such that the solder contact angle is 90° or below, even more preferably 80° or below most preferably 75° or below.

Good wetting of the electrically conductive layer or the solder-contacting surface(s) of the first connector foot and/or the second connector foot, advantageously both electrically conductive layer and the solder-contacting surface(s) of the first connector foot and/or the second connector foot, tends to reduce stress on the glass. Solder contact angle may be measured as is known to those skilled in the art by measuring the angle at the edge of a drop or mass of solder on a surface (an example of the method is as indicated in Duong et al. *Mater. Trans.* 49 (2008) p. 1462).

In a third aspect, the present invention provides, a method of soldering an electrical connector to a glazing, the method comprising, providing a pane of glazing material with an electrically conductive layer on a surface of the pane, providing an electrical connector as discussed in relation to the first aspect preferably comprising a first connector foot and a second connector foot for soldering to the glazing, and a bridge portion comprising sheet metal having a thickness in the range 0.1 mm to 0.8 mm linking the first connector foot and second connector foot, wherein the first connector foot and the second connector foot each are shaped so that 60% or more of the perimeter of each foot is curved, and there is a solder deposit on each connector foot, and fusing the solder.

BRIEF DESCRIPTION OF THE DRAWINGS

The present invention will now be described by way of example only, and with reference to the accompanying drawings, in which:

FIG. 3 illustrates a third connector according to the invention in (a) bottom plan view, and (b) top plan view;

DETAILED DESCRIPTION

Figure 1:
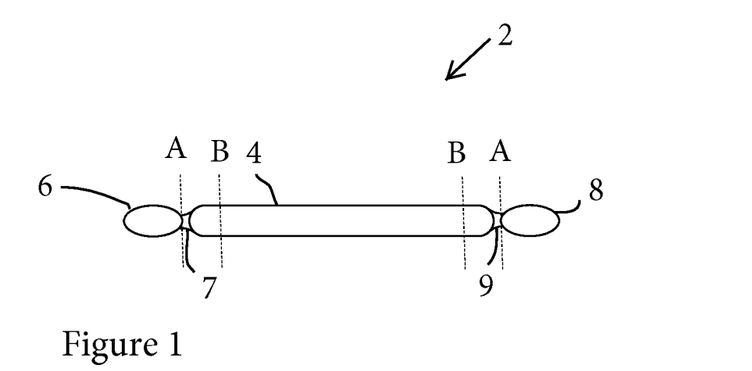
FIG. 1 illustrates a first connector according to the invention in top plan view.

FIG. 1 shows a first type of a bridge-type electrical connector 2 according to the present invention. The connector 2 comprises a first connector foot 6 and a second connector foot 8, the first 6 and second 8 connector feet being linked by a bridge 4. The bridge 4 and first connector foot 6 are connected by a narrower (narrower in width than the bridge 4) first neck portion 7 which has concave curves sides/edges each with a radius of curvature. The narrow neck portion improves stress distribution on the glazing during soldering. The bridge 4 and second connector foot 8 are similarly connected by a narrower second neck portion 9 which has concave curves sides/edges. The connector 2 may be formed by stamping/cutting the connector 2 from sheet metal, for example mild steel. In use the first and second connector feet 6, 8 are soldered to the glazing, and the bridge 4 is positioned at a height h in the range 1 mm to 4 mm above the glazing surface. Positioning the bridge at a height above the surface is accomplished by double folding the connector 2 in the region of the first and second connector feet 6, 8 along respective lines A (in a valley fold so that, in the top orientation as shown in FIG. 1, the first connector foot 6 would be substantially in the plane of the paper and the bridge 4 would come out of the paper) and folding the bridge 4 along respective lines B in mountain folds. After the double folds A and B are made, in a side view, the connector 2 in the area of the first and second connector feet 6, 8 has a step-like profile; the angles of the folds may be acute, approximately right angled or obtuse.

Figure 2:
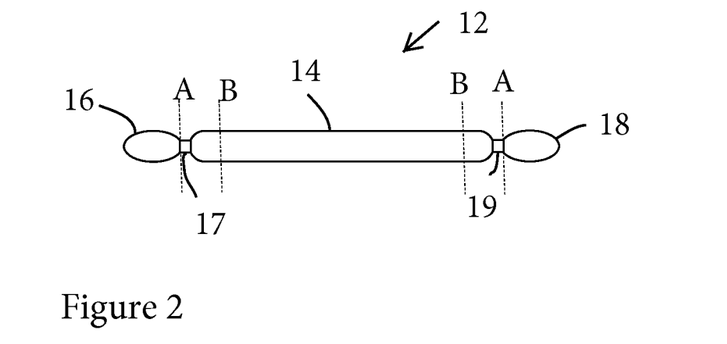
FIG. 2 illustrates a second connector according to the invention in top plan view.

FIG. 2 shows a second type of a bridge-type electrical connector 12 according to the present invention. The connector 12 comprises a first connector foot 16 and a second connector foot 18, the first 16 and second 18 connector feet being linked by a bridge 14. The bridge 14 and first connector foot 16 are connected by a narrower (narrower in width than the bridge 4) first neck portion 17 which has square sides/edges. This alternative form of the narrow neck portion also improves stress distribution on the glazing during soldering. The bridge 14 and second connector foot 18 are similarly connected by a narrower second neck portion 19 which has square sides/edges. As in the first connector 2 illustrated in FIG. 1, the connector 12 is shaped in the region of first and second connector feet 16, 18 with a double fold along respective lines A in a valley fold and along respective lines B in mountain folds. After the double folds A and B are made, in a side view, the connector 12 in the area of the first and second connector feet 16, 18 also has a step-like profile; the angles of the folds may be acute, approximately right angled or obtuse.

Figure 3A:
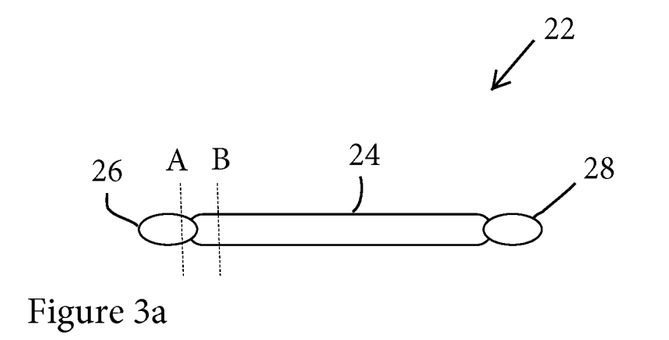
Figure 3B:
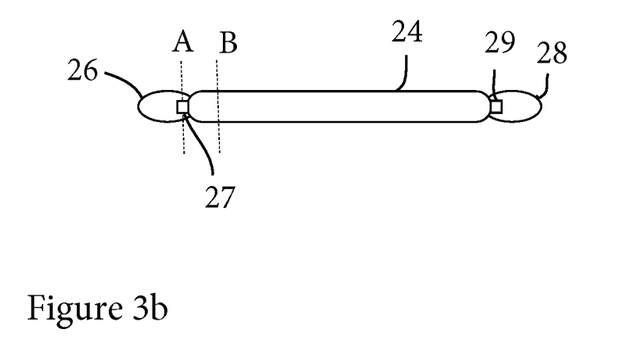

FIG. 3 shows a third type of a bridge-type electrical connector 22 according to the present invention in (a) bottom plan view and (b) top plan view. The connector 22 as in FIGS. 1 and 2 comprises a first connector foot 26 and a second connector foot 28, the first 26 and second 28 connector feet being linked by a bridge 24. The bridge 24 and first connector foot 26 are connected by a narrow first neck portion 27 which has square sides/edges and is in this connector 22 joined (e.g. by soldering or welding) to the top surface of the first connector foot 26. This alternative form of the neck portion 27 improves stress distribution on the glazing during soldering and also, because it allows the first connector foot to have a perimeter that has no straight sides or corners (i.e. the perimeter is closed curve, generally in an elliptical shape), solder distribution and flow under the foot is much improved. The bridge 24 and second connector foot 28 are similarly connected by a second neck portion 29. As in the first connector 2 illustrated in FIG. 1, the connector 22 is shaped in the region of the first and second connector feet 26, 28 in the form of a double fold along respective lines A in a valley fold and along respective lines B in mountain folds. After the double folds A and B are made, in a side view, the connector 22 in the area of the first and second connector feet 26, 28 also has a step-like profile; the angles of the folds may be acute, approximately right angled or obtuse.

FIGS. 4, 5, 6, 7 and 8 show, highly schematically, cross-sectional side views of embodiments of the connector. The same reference numerals refer, in FIGS. 4 to 8, to similar or equivalent features.

Figure 4:
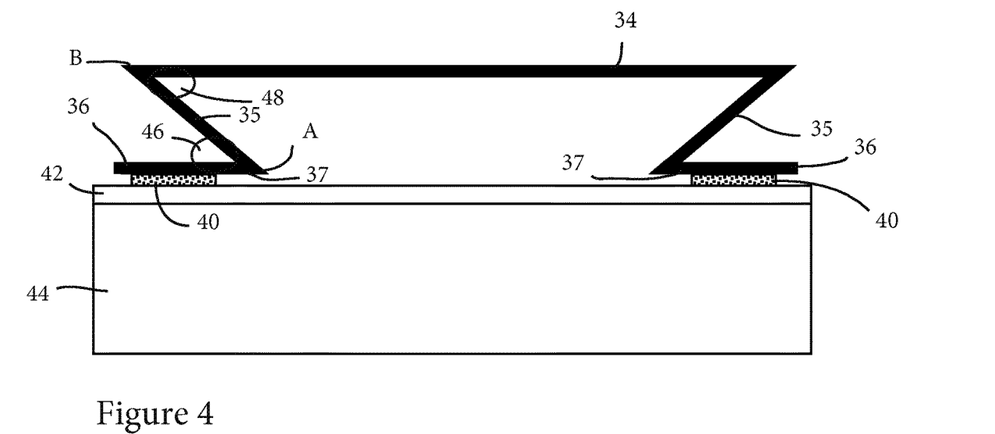
FIG. 4 shows a schematic cross sectional side view of a fourth connector according to the invention.

FIG. 4 shows a connector with a bridge 34 joining two connector feet 36. The connector feet 36 are soldered through solder fillets 40 to an electrically conductive coating 42 deposited on a glass substrate 44. The electrically conductive coating 42 will usually comprise silver, preferably, silver particles and a glass frit. Each connector foot 36 is connected to the bridge 34 (and therefore connected electrically to the other connector foot 36) via neck portions 37 and AB portions 35. The connector is double folded in the region of each connector foot 36 by fold A between the neck portion 37 and AB portion 35 (subtending an angle 46 between the connector foot 36 and the AB portion 35) and a fold B between the AB portion 35 and the bridge 34 (subtending an angle 48 between the AB portion 35 and the bridge 34). In the embodiment of FIG. 4, the angles 46 and 48 are acute, and approximately the same, so that the double folds form a step-like, Z shaped profile. In other embodiments, the A and B folds may be different so that angles 46 and 48 may be independently selected. In FIG. 4, the A and B folds are sharp with very small radii of curvature.

Figure 5:
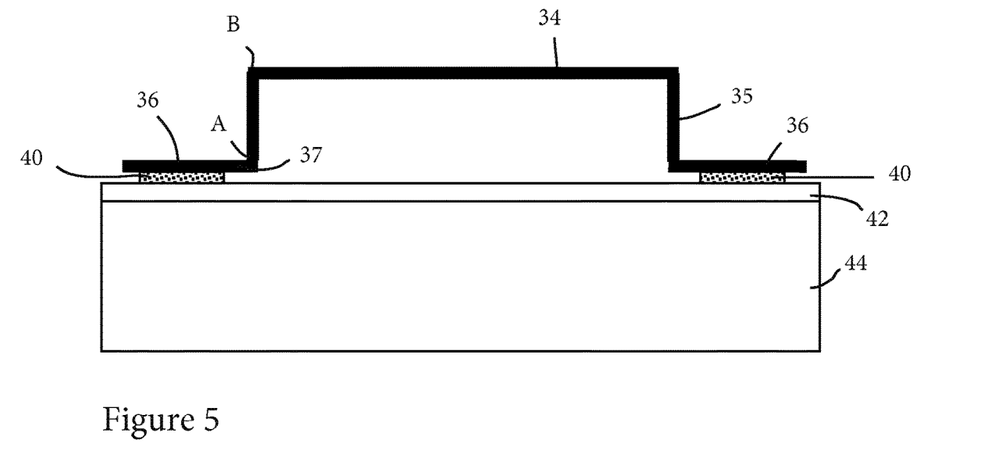
FIG. 5 shows a schematic cross sectional side view of a fifth connector according to the invention.

The connector shown in FIG. 5 is generally similar to that of FIG. 4 and will not be described in detail. The A and B folds in the connector of FIG. 5 are each at approximate right angles.

Figure 6:
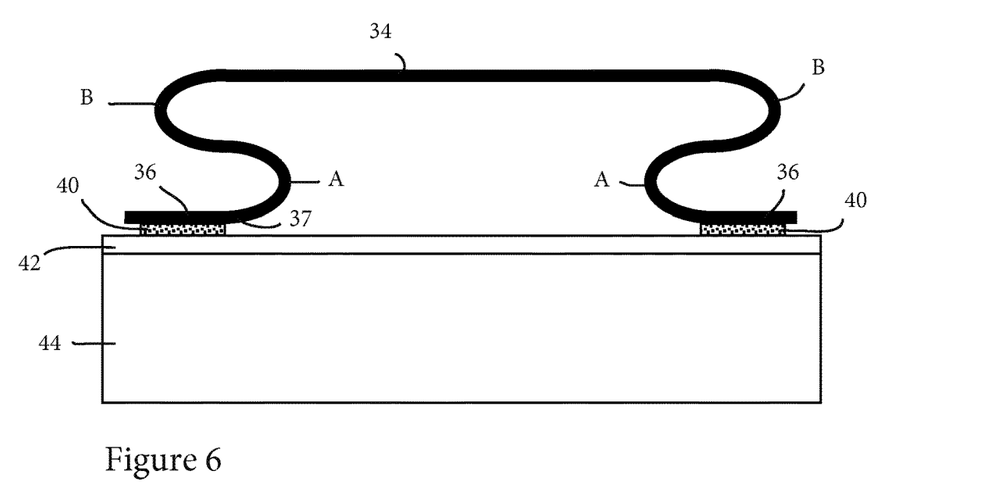
FIG. 6 shows a schematic cross sectional side view of a sixth connector according to the invention.

FIG. 6 shows a connector where the A fold and B fold are of greater radius of curvature than those of the embodiment of FIGS. 4 and 5. Thus, the profile is generally of an "S"-shape.

Figure 7:
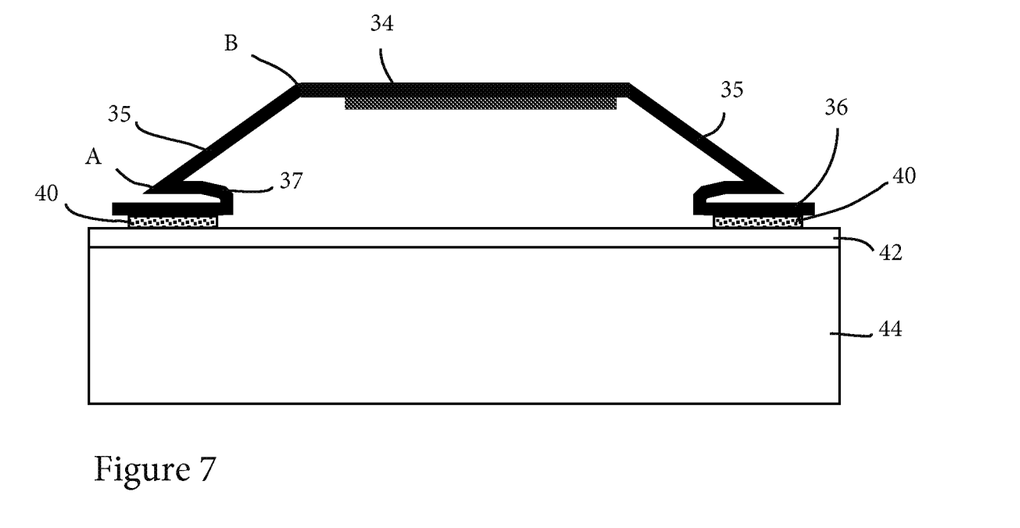
FIG. 7 shows a schematic cross sectional side view of a seventh connector according to the invention.

FIG. 7 shows a connector where each neck portion 37 is bent back (forming a hairpin fold) so that the A fold between the neck portion 37 and AB portion 35 is directly above the connector foot 36. The projection of the AB portion 35 towards the substrate 44 surface (when the connector is in use) therefore intersects with the connector foot 36 which has advantages in reducing stress in use. The angle of the A fold is obtuse as is the angle of the B fold.

Figure 8:
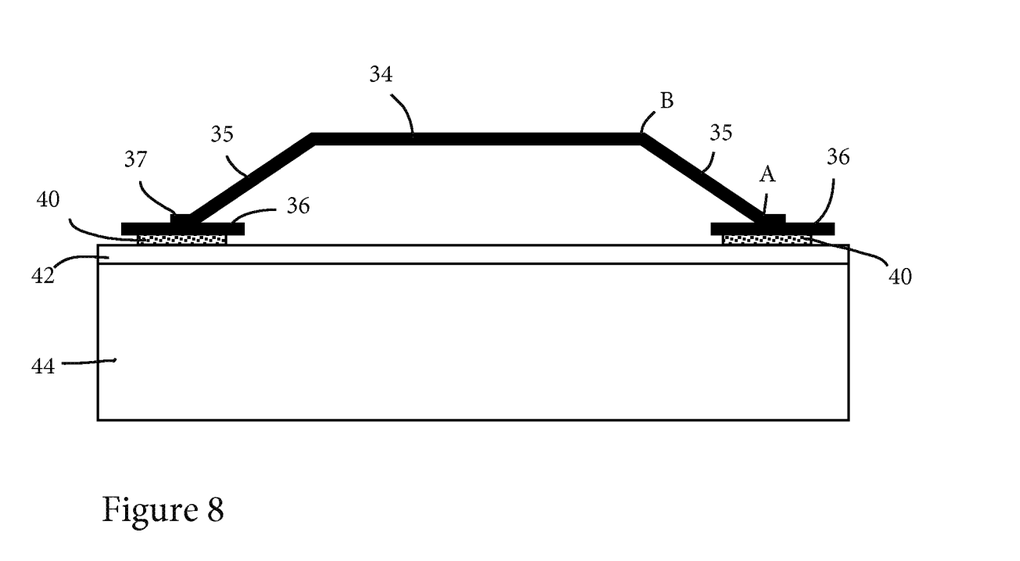
FIG. 8 shows a schematic cross sectional side view of an eighth connector according to the invention.

FIG. 8 shows a connector generally as indicated in FIG. 3, with the neck portion 37 joined (e.g. by soldering or welding) to the top surface of the first connector foot 36. This has great advantages in terms of reducing stress and allowing the connector foot 36 to have a perimeter that has no straight sides or corners (i.e. the perimeter is closed curve, generally in an elliptical shape) so that solder distribution and flow under the foot is much improved. As in the connector of FIG. 7, the projection of the AB portion 35 towards the substrate 44 (when the connector is in use) intersects with the connector foot 36 which has advantages in reducing stress in use. The angle of the A fold is obtuse as is the angle of the B fold.

A finite element analysis (FEA) simulation was conducted to evaluate changing the design of connector on the stress on the glass in a temperature cycling test between −40° C. and +105° C.

In a comparative Example, a connector made of 0.8 mm thick copper soldered on to 1.6 mm thick glass with a 0.5 mmm thick solder layer (solder 50 wt % Pb and 50 wt % Sn: ASTM Sn50) and being simulated as a quarter symmetric finite element model having a rectangular shape (i.e. straight edges with no curvature), a foot of 4 mm length, an AB portion of 3 mm length and a bridge of 3.15 mm length with a bridge height 1.6 mm, angle of the A fold (i.e. angle between the A fold to B fold portion of the electrical connector and the bridge portion) 165° (equivalent to an angle of 15° from the glass surface to the AB portion) showed stress of 76.40 MPa at −40° C. and of 36.22 MPa at +105° C.

In an optimised Example 1 a connector on 1.6 mm thick glass with a 0.2 mm thick, 4 mm long Sn20B solder (wetting the surfaces), having a 0.4 mm thick FeNi49 alloy connector with 4 mm long foot, and 1 mm necking in the AB portion (i.e. narrow neck portion) with 1 mm radius corners on each corner of the foot (i.e. providing a curved perimeter of each foot), with 1.6 mm overall connector height with an angle of the A fold of 141° (equivalent to an angle of 39° from the glass surface to the AB portion) showed much reduced stress of 16.33 MPa at −40° C. and of 18.45 MPa at +105° C.

REFERENCE NUMERALS 2 connector
4 bridge
6 first connector foot
7 first neck portion
8 second connector foot
9 second neck portion
12 connector
14 bridge
16 first connector foot
17 first neck portion
18 second connector foot
19 second neck portion 22 connector
24 bridge
26 first connector foot
27 first neck portion
28 second connector foot
29 second neck portion
34 bridge
35 AB portion
36 connector foot
37 neck portion
40 solder
42 electrically conductive coating
44 glass substrate
46 angle of A fold
48 angle of B fold

The invention claimed is:

1. An electrical connector for a glazing, the electrical connector comprising a first connector foot and a second connector foot for soldering to the glazing, and a bridge portion comprising sheet metal having a thickness in the range 0.1 mm to 0.8 mm linking the first connector foot and second connector foot, wherein the first connector foot and the second connector foot each are shaped so that 60% or more of the perimeter of each foot is curved and wherein the first connector foot and the second connector foot are connected to the bridge portion by a first neck portion and a second neck portion respectively and the first neck portion and the second neck portion each have a narrower width than a width of the bridge portion.

2. An electrical connector as claimed in claim 1, wherein sides of the first and second neck portion are curved.

3. An electrical connector as claimed in claim 1, wherein the curved portion of the perimeter of the first connector foot and the perimeter of the second connector foot each form a convex curve.

4. An electrical connector as claimed in claim 1, wherein when the first and second connector feet are positioned on a glazing, the bridge portion is at a height h above the first and/or second connector feet, wherein h is in the range 1 mm to 6 mm.

5. An electrical connector as claimed in claim 1, wherein the first connector foot and the second connector foot are also formed, at least partly, from the sheet metal.

6. An electrical connector as claimed in claim 1, wherein the sheet metal has a thermal conductivity in the range 35 to 65 W/m° C.

7. An electrical connector as claimed in claim 1, wherein the sheet metal has a thermal expansion coefficient in the range 1 to $20 \times 10^{-6}$ /° C.

8. An electrical connector as claimed in claim 1, wherein the sheet metal has an electrical conductivity in the range 1 to $9 \times 10^6$ S/m.

9. An electrical connector as claimed in claim 1, wherein each connector foot comprises a solder-contacting surface having at least one spacer to space the foot from the surface of the glazing.

10. An electrical connector as claimed in claim 1, wherein at least a portion of each connector comprises a coating comprising copper, zinc, tin, silver, gold, or alloys or layers thereof.

11. A method of soldering an electrical connector to a glazing, the method comprising:
    providing a pane of glazing material with an electrically conductive layer on a surface of the pane,
    providing an electrical connector as claimed in claim 1 wherein each connector foot comprises a solder-contacting surface with a solder deposit on each connector foot, and
    fusing the solder,
    wherein the solder, the electrically conductive layer and the first connector foot are adapted so that the solder wets the electrically conductive layer and the solder-contacting surface of the first connector foot.

12. An electrical connector as claimed in claim 1, further comprising a solder deposit adhered to each foot of the connector.

13. An electrical connector as claimed in claim 12, wherein the solder deposit is an annular solder deposit.

14. A glazing comprising,
    a pane of glazing material,
    an electrically conductive layer on a surface of the pane,
    a solder deposit on the electrically conductive layer, and
    an electrical connector as claimed in claim 1 on the solder deposit, wherein the first connector foot is soldered to the glazing and the second connector foot is soldered to the glazing.

15. A glazing as claimed in claim 14, wherein the solder comprises lead-free solder.

16. An electrical connector as claimed in claim 1, further comprising a double fold comprising an A fold and a B fold between each connector foot and the bridge.

17. An electrical connector as claimed in claim 16, wherein the electrical connector has a step-shaped profile in a side view.

18. An electrical connector as claimed in claim 16, wherein the angle of the A fold is acute or right-angled.

19. An electrical connector as claimed in claim 16, wherein the A fold and the B fold, independently, each have a radius of curvature in the range 0.5 mm to 5 mm.

20. An electrical connector as claimed in claim 19, wherein the double fold forms an S-shaped profile.

* * * * *